Dec. 26, 1961   J. J. SHAWK   3,014,456
HOG RINGING CRATE

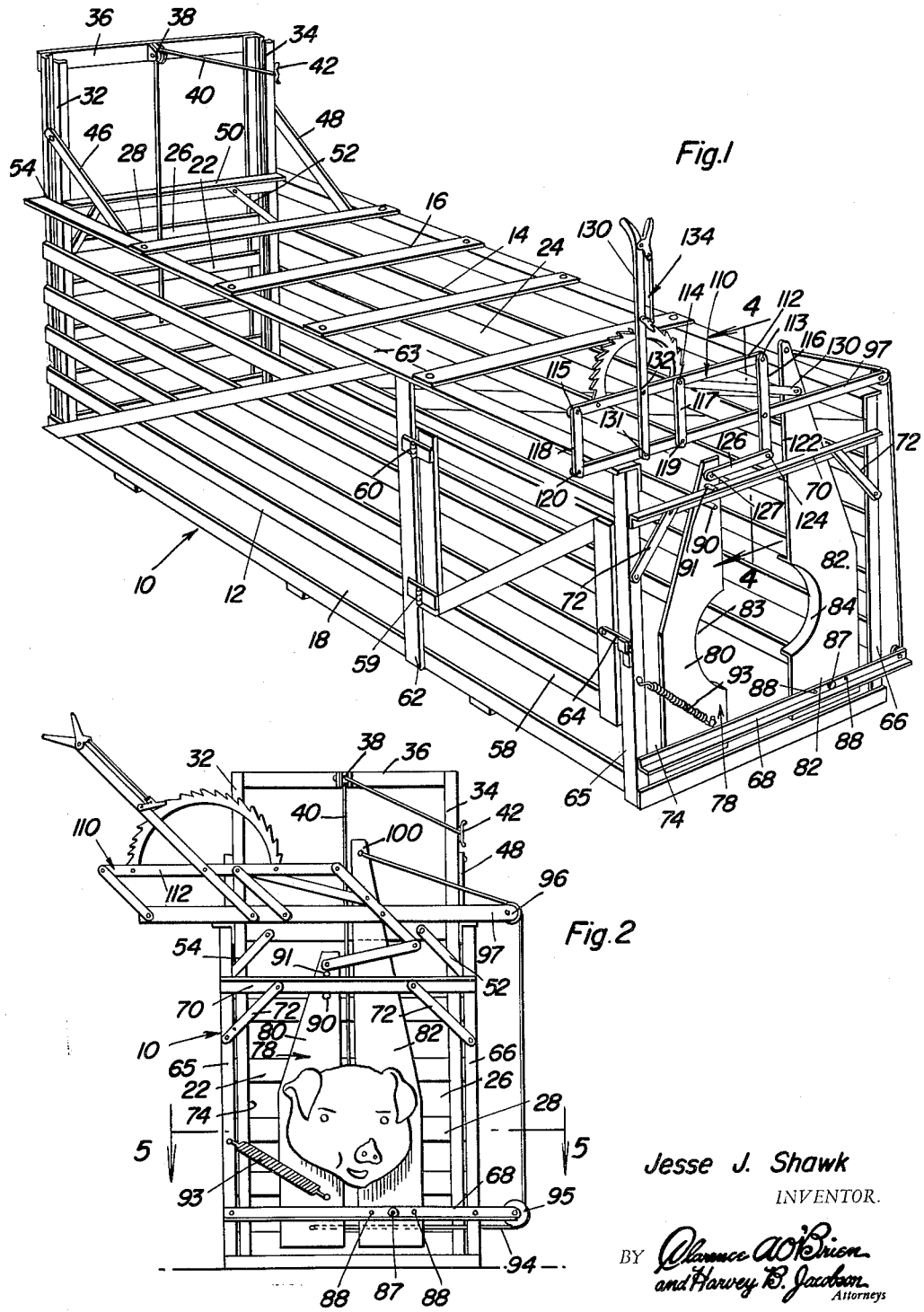

Filed July 1, 1959   2 Sheets-Sheet 2

Jesse J. Shawk
INVENTOR.

BY Clarence A. O'Brien
and Harvey B. Jacobson
Attorneys

3,014,456
HOG RINGING CRATE
Jesse J. Shawk, College Mound, Mo.
Filed July 1, 1959, Ser. No. 824,228
1 Claim. (Cl. 119—99)

This invention relates to a device to facilitate the handling of hogs and more particularly to a hog ringing trap or crate.

An object of the invention is to provide a hog ringing crate which is easy to use and very materially facilitates the job of ringing hogs.

Briefly, the hog ringing crate includes a wall structure forming a chute or tunnel within which the hog is held captive. One end of the tunnel has a holding structure which is capable of being operated very quickly and locked in place. The holding structure is very easily and promptly released, after which the hog may be removed through a gate located adjacent to the holding structure.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the hog ringing crate.

FIGURE 2 is a front view of the hog ringing crate showing the holding or jaw structure in a closed position.

Figure 3:
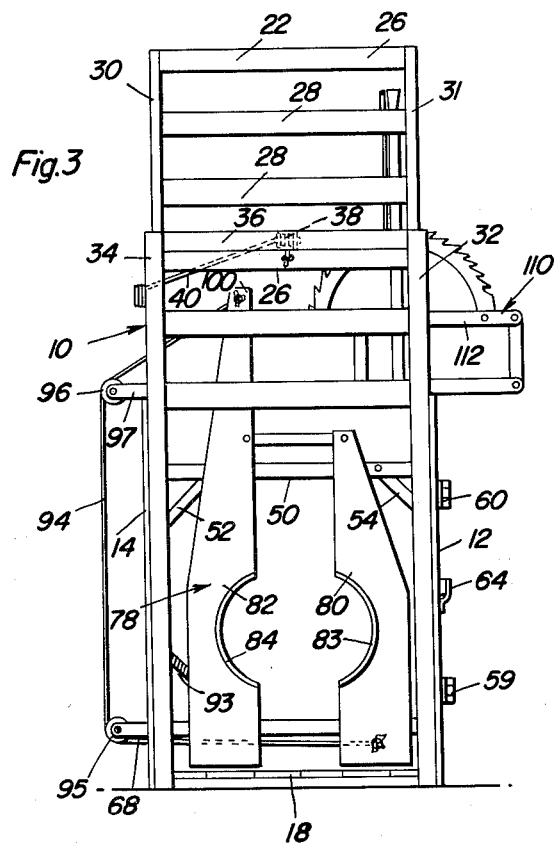
FIGURE 3 is a rear view of the crate.
Figure 4:
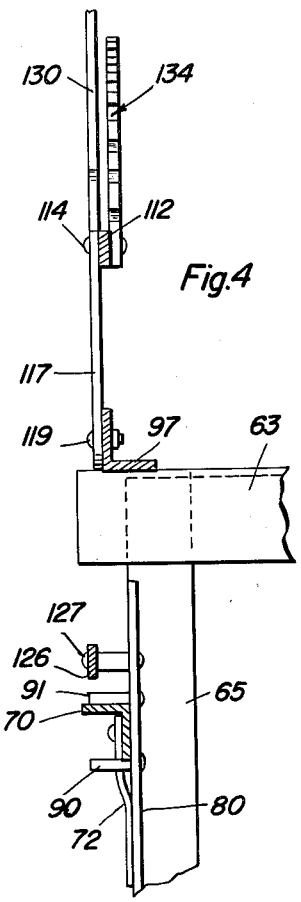
FIGURE 4 is a sectional view taken on the line 4—4 of FIGURE 1 and on an enlarged scale.

In the accompanying drawings there is a hog ringing chute or crate 10 having slatted side walls 12 and 14 together with a slatted top 16 and a platform 18 at the bottom. Frame structure is used for forming the side walls and top, and the base 18 is preferably made of boards, although this may be varied.

Entrance gate 22 which is also of slatted construction, is at one end of the tunnel 24 defined by the side walls and top of floor 18 in order to control the admission of hogs to the tunnel. Gate 22 is made of a gate panel 26 having a number of transverse frame members 28, side members 30 and 31 and means securing these members together to form the gate panel. Two vertical rails 32 and 34, each consisting of an inwardly opening channel, are secured to sides 12 and 14, and the gate panel is vertically slidable therein. A crosshead 36 is attached to the upper parts of rails 32 and 34 and supports a pulley 38 over which a rope 40 is entrained. Rope holder 42 is secured to rail 34 so that the rope can be easily tied or released when necessary. One end of the rope is secured to one of the transverse members 28. As is shown in FIGURE 1, the rope can easily be pulled to thereby elevate the gate, noting that the rope is tied low on the gate. When the gate is to be released, the rope is simply released thereby allowing the gate to fall the lowered position in its rails 32 and 34. Note further from FIGURE 1 that there are a number of reinforcing members where they are considered to be desirable. For instance diagonal reinforcing members 46 and 48 extend from the rails to the top members of sides 12 and 16. A transverse angle member 50 is secured to both of the rails beneath the crosshead 36, and it has reinforcing braces 52 and 54 attached to it and secured to rails 32 and 34.

There is a discharge gate 58 mounted on hinges 59 and 60. Gate post 62 constitutes a part of side 12 and is secured to the bottom and top member 63 of side 12. The discharge gate 58 has a latch 64 that is easily released, the latch operating between post 65 and one side of gate 58.

Figure 5:
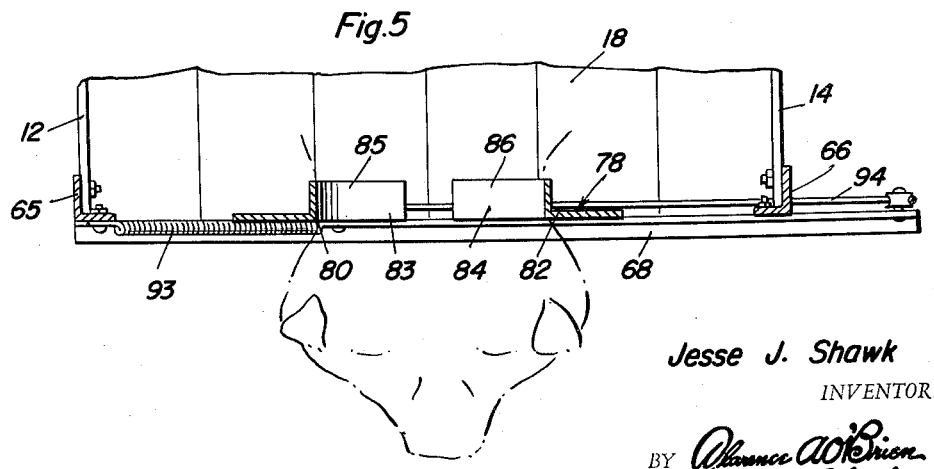
FIGURE 5 is a sectional view on an enlarged scale and taken on the line 5—5 of FIGURE 2.

Post 65 is one of a pair of such posts 65 and 66, and they are located at the end of the tunnel opposite to that occupied by gate 26. The posts 65 and 66 constitute part of the sides 12 and 14, and they cooperate with a lower bar or angle member 68 that extends transversely across and is secured to the posts 65 and 66, together with an upper transverse bar or member 70 which is similarly secured and braced by braces 72 to posts 65 and 66, to frame an opening 74 occupied by the holding structure 78. The holding structure is made of a pair of jaws 80 and 82, each of which is formed with a confronting recess 83 and 84. The recesses 83 and 84 have collars 85 and 86 (FIGURE 5) attached thereto and as shown in FIGURES 5 and 2 they are adapted to engage the neck of a hog.

Jaw 80 is movable in unison with jaw 82 between the open and closed positions as shown in FIGURES 1 and 2 respectively. Jaw members 80 and 82 each have portions located behind member 68, and jaw member 82 is fastened by pin 87 to member 68 by having the pin fit into one of a group of apertures 88 in member 68. This allows the jaw member 82 to be adjusted with respect to jaw member 80 to accommodate large or small hogs. Jaw member 80 has a pair of pins 90 and 91 attached to the front face thereof and spaced from each other a sufficient distance so that they straddle member 70 to aid in constraining the movement of jaw member 80. Return spring 93 is secured at one end to jaw member 80 and secured at the other end to post 65. Spring 93 is a tension spring that is stretched when the jaws are brought together (FIGURE 5) and that tends to return jaw member 80 to the initial or rest position as shown in FIGURE 1.

There is means for operating the jaw members between the open and closed positions. This means comprises a cable 94, rope or other flexible elongated member which is attached at one end to jaw member 80 and which extends over guide or idler pulleys 95 and 96 at one end of member 68 and transverse fixed or stationary member 97 that is secured to the upper ends of posts 65 and 66. The end of cable 94 opposite to that end which is secured to jaw or jaw member 80, is secured to an upstanding portion 100 of jaw or jaw member 82.

A parallelogram linkage 110 is connected with member 97. The parallelogram linkage includes an upper link 112 connected by pivots 113, 114 and 115 to links 116, 117 and 118. Links 117 and 118 are shorter than link 116. The lower ends of links 117 and 118 are connected by pivots 119 and 120 to member 97, while link 116 has a pivot connection 122 with member 97 and a pivot 124 connects the lower extremity of link 116 with a link 126. There is a pivot 127 connecting link 126 with the upper end of jaw member 80. Pitman 130 is pivoted to jaw member 82 and connected with the parallelogram linkage by pivot 114.

An operating lever 130 is connected by pivots 131 and 132 to the member 97 and link 110 respectively. A conventional locking dog and quadrant ratchet mechanism 134 is operatively connected to the lever 130 and to link 110 in order to hold the parallelogram linkage and consequently the jaws or jaw members 80 and 82 in selected opened and closed positions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A hog ringing trap comprising a chute open at its ends, a pair of transversely spaced posts on one of said ends, vertically spaced upper and lower horizontal bars extending between said posts, a vertically elongated jaw pivotally secured at its lower end portion to the lower bar for swinging movement in a vertical plane and having its upper portion slidably engaged with the inner side of the upper bar and extending thereabove, a vertically elongated complementary jaw slidably suspended from the upper bar on the inner side thereof and having its lower end portion slidably engaged with the inner side of the lower bar, said jaws for receiving and clamping the neck of a hog to be ringed therebetween, means operatively connecting the lower end of the slidable jaw to the free end of the pivoted jaw for actuation thereby toward a closed position, a return spring connected to said lower end of said slidable jaw for yieldingly urging same toward an open position, and common, manually actuated means operatively connected to the upper end portions of the jaws for positively closing and opening same in unison, the last named means comprising a horizontal bar mounted transversely on said one end of the chute adjacent to and in vertically spaced parallelism with said upper bar, a parallelogram bar mounted on the third named bar, a hand lever pivotally secured at one end on said third named bar and at an intermediate point to said parallelogram bar for actuating the latter, a second lever pivotally mounted at an intermediate point on the third named bar and having one end pivotally connected to the parallelogram bar for actuation thereby, a link operatively connecting the other end of the second named lever to the upper end portion of the slidable jaw, and a pitman operatively connecting the parallelogram bar to said free end of the pivoted jaw, one end portion of said lower and said third named bars projecting laterally beyond the chute, the first named means including guide pulleys mounted on the projecting end portions of said lower and said third named bars, and a cable trained over said pulleys and having one end connected to said free end of said pivoted jaw and its other end connected to said lower end portion of said slidable jaw.

References Cited in the file of this patent

UNITED STATES PATENTS

| | | |
|---|---|---|
| 730,049 | Sage | June 2, 1903 |
| 1,166,450 | Dolan | Jan. 4, 1916 |
| 1,227,712 | Watson | May 29, 1917 |
| 2,214,969 | McNett | Sept. 17, 1940 |
| 2,408,872 | Newbold | Oct. 8, 1946 |
| 2,571,487 | Rolfe et al. | Oct. 16, 1951 |